United States Patent [19]

Larson et al.

[11] 4,349,572

[45] Sep. 14, 1982

[54] PROCESS OF RECYCLING ANIMAL WASTE

[76] Inventors: Roger R. Larson, 2501 Bedford Dr.; Efton E. Hatfield, 1103 Westlawn St., both of Champaign, Ill. 61820

[21] Appl. No.: 943,633

[22] Filed: Sep. 19, 1978

Related U.S. Application Data

[60] Continuation of Ser. No. 688,722, May 21, 1976, which is a division of Ser. No. 553,647, Feb. 27, 1975.

[51] Int. Cl.$^3$ ............................................... A23K 3/00
[52] U.S. Cl. ..................................... 426/335; 426/69; 426/532; 426/807
[58] Field of Search ................ 426/69, 335, 532, 807

[56] References Cited

U.S. PATENT DOCUMENTS

| | | | |
|---|---|---|---|
| 3,503,751 | 3/1970 | Durham | 426/69 |
| 3,743,496 | 7/1973 | Seltzer | 426/69 |
| 3,831,288 | 8/1974 | Stribling et al. | 426/807 |
| 3,939,280 | 2/1976 | Karnemaat | 426/69 |
| 3,989,846 | 11/1976 | Helgerson | 426/807 |

OTHER PUBLICATIONS

Recycling Animal Wastes, Dr. Robert Blair, Feedstuffs, p. 32, 3/5/73.

*Primary Examiner*—Norman Yudkoff
*Attorney, Agent, or Firm*—Harvey B. Jacobson

[57] ABSTRACT

Livestock and poultry excreta can be treated to destroy pathogenic bacteria therein and to eliminate offensive odors by contacting the excreta with from 0.10 to 3% by weight of the waste matter of a liquid aldehyde, preferably formaldehyde in aqueous solution.

10 Claims, No Drawings

PROCESS OF RECYCLING ANIMAL WASTE

This is a continuation of application Ser. No. 688,722, filed May 21, 1976, which in turn, is a divisional of application Ser. No. 553,647, filed Feb. 27, 1975.

The present invention relates to a supplemental feed composition intended primarily for ruminants and, more particularly, to a feed supplement derived from animal excreta.

It is well known that there exists a great abundance of livestock feedlot and poultry excreta which pollutes the air with offensive odors and pollutes the streams with pathogenic organisms and toxic compounds. Disposal of the excreta is a serious problem which has been confronted in various ways but which never has been satisfactorily solved.

Excreta, such as cow manure, consists in large part of crude fiber, but also contains significant quantities of bacteria, fats and nitrogenous substances, such as ammonia and amines. Moreover, the excreta may contain up to 80% or more of the minerals, e.g., calcium, phosphorus, potassium, previously fed to the animal. THe mineral, protein and fat content, as well as the bulk, of the excreta are all desirable components for recycling to the animal. However, it is generally appreciated that excreta has a relatively low level of acceptability to the animal due, in part, to its offensive odor. This low acceptability, together with the high incidence of pathogenic bacteria in the excreta, has been the main reason heretofore that excreta has not been considered as very desirable for recycling to animals.

Accordingly, it is an object of the present invention to provide a supplemental feed composition derived from livestock waste which is substantially odor-free and therefore highly acceptable to animals.

It is another object of the invention to provide livestock waste based animal feed supplement which is free of pathogenic bacteria.

It is another object of the invention to provide a supplemental feed composition which has an extended shelf life.

It is another object of the invention to provide a feed supplement which will contain most of the necessary supplemental essential minerals and crude protein.

It is yet another object of the invention to provide a process for treating animal fecal matter to provide a pathogen-free, deodorized, long shelf life product which is suitable as a feed supplement for ruminant animals.

Other objects and advantages will become apparent from the following description and appended claims.

In accordance with the aforesaid objects the present invention comprises an animal feed supplement intended primarily for ruminants, e.g., cattle, sheep, goats, oxen, deer and antelopes, but which may also be suitable as a supplemental feed composition for other animals as well. The supplement of the present invention may be prepared by treating animal excreta matter with an aldehyde, as by spraying or mixing the excreta with the aldehyde. The resulting aldehyde-treated material is a non-air-polluting substantially odor-free, pathogen-free nutritious product that is highly acceptable to animals in their feed. In addition, the aldehyde-treated material finds broad utility as an aesthetically acceptable source of plant nutrients and soil conditioner for the production of flowers, shrubs, vegetable gardens, lawns, field crops and pastures.

The excreta material useful in the present invention may be either fresh or aged matter obtained from livestock feedlot and poultry production waste. Thus, the excreta of ruminants is highly suitable as is the excreta of poultry. In addition, fecal matter of other animals, such as horses, hogs, and the like, is also useful. Poultry excreta may be derived, for example, from deep litter poultry farming or from battery farming of cage birds. It will be appreciated that in the collection of feedlot livestock and/or poultry excreta, it is almost unavoidable that other waste, such as bedding, litter, hair, feathers, and the like, will be collected with the excreta. These other wastes are generally not present in large quantities and do not adversely affect the supplemental feed composition of this invention. Therefore, as used herein, the term "livestock and poultry wastes" contemplates excreta as well as ordinary livestock and poultry non-excreta wastes.

The excreta is treated, in accordance with the present invention, with an aldehyde to form the desired feed supplement. Any aldehyde can be used, e.g., formaldehyde, glyoxal, acetaldehyde, acrolein, propionaldehyde, n-butyraldehyde, n-valeraldehyde, isobutyraldehyde and glutaraldehyde. However, by far the most economical and widely available aldehyde is formaldehyde and it would indeed be unusual, from a practical and commercial standpoint, to prepare the feed supplement with any other aldehyde. The formaldehyde may be used in any one of its commercially available forms, such as, formalin solution, "Formacel", and the like. For reasons which will be discussed in greater detail hereinafter, the quantity of aldehyde employed should be no less than about 0.10% by weight of the excreta and not more than about 3% by weight of the fecal matter. It is preferred to employ the aldehyde in amounts ranging from 0.74% to 2.2% by weight of the fecal matter. Below about 0.74%, the storage life of the feed supplement begins to deteriorate and some microbial activity may be present at high moisture contents. Using more than about 2.2% of an aldehyde is wasteful and unnecessary and the feed supplement begins to evidence the characteristic aldehyde odor.

To confirm that the aldehydes destroy pathogenic fecal microbes and prevent mold growth, cattle manure was collected and treated with formalin. The manure was separated into six portions and each portion treated with a predetermined quantity of formalin such that the manure portions were treated, respectively, with 0.18%, 0.37%, 0.55%, 0.74%, 1.10% and 2.20% formaldehyde. Fifty parts from each portion were mixed with 25 parts of cottonseed hulls and 25 parts of ground corn to formulate a ruminant feed mixture. Samples of each of the feed portions were taken to determine microbial activity, shelf life and chemical composition.

The presence of microbial activity, and especially pathogen viability, was determined by inoculating samples of each of the feed portions in the prescribed mediums for Salmonella isolation and identification and incubated therein at 37° C. for periods of 16–48 hours in accordance with techniques described in *Difco Manual of Dehydrated Culture Media and Reagents for Microbiological and Clinical Laboratory Procedures,* 9th Ed., Difco Laboratories, Detroit, Mich. (1953). Using selenite or tetrathianate, MacConkey, S. S., bismuth sulfite, TSI, Simmons citrate, urease and gram stain as the selective and differentiating media, no Salmonella were found to be present. Detection of fecal coliforms, in particular *Escherichia coli*, was also conducted in accordance with the procedures set forth in the *Difco Manual.* Using lactose broth, E.M.B., Methyl Red, Vogues-Proskauer, Simmons Citrate, urease and gram stain as the selective and differentiating media, *E. coli* was found to be present only in the 0.18% formaldehyde treated sample, which sample contained about 31% moisture. It is, therefore, believed that a 0.18% formaldehyde treated feed supplement composition could only be used if the moisture content is low and if the composition is to be fed immediately to the animal.

Six samples were taken from each of the six formaldehyde treated manure feed portions. Three of the samples from each portion were adjusted to 31% moisture and the other three samples were adjusted to 70% moisture content. The samples were bagged in plastic, sealed and incubated at 12° C., 25° c. and 37° c. to ascertain the shelf life of the formaldehyde-treated manure compositions. It was determined that a moisture content of 70% was conducive to mold growth in from about 4–21 days at room temperature irrespective of the quantity of formaldehyde used in making the sample. Therefore, the animal feed supplement of the invention should contain less than 70% moisture unless it is going to be fed immediately to the animals, i.e., it is not to be stored. However, as long as the moisture content is less than 70%, and preferably from about 10% to 50%, the samples treated with at least 0.74% formaldehyde showed no mold growth whatever after lengthy observation. When no mold growth was observed after 12 weeks, the experiments were terminated. It was concluded that 0.74% formaldehyde treatment of cattle manure destroyed microbial activity and prevented the production of aflatoxins upon feed storage. For samples treated with less than 0.74% formaldehyde, mold growth was observed after about 4–21 days, depending upon moisture content, incubation temperature and quantity of formaldehyde used. Therefore, feed supplement compositions prepared using less than about 0.74% formaldehyde are not expected to have an appreciable shelf life and should be fed immediately to the animals.

Samples of each of the original six portions were analyzed according to *Official Methods of Analysis of the Association of Official Analytical Chemists,* 11th Ed., Horwitz, William, Washington, D.C. (1970), and the data are presented in Table I.

TABLE I

| % HCHO | pH | % Moisture | % Protein* | % $NH_4^{+*}$ | % Fat |
|--------|------|-----------|-----------|-------|-------|
| 0.18 | 7.93 | 33.1 | 7.32 | 0.018 | 1.98 |
| 0.37 | 7.58 | 33.9 | 7.56 | 0.015 | 3.8 |
| 0.55 | 7.47 | 29.9 | 7.62 | 0.018 | — |
| 0.74 | 7.52 | 33.5 | 7.62 | 0.015 | 1.84 |
| 1.10 | 7.41 | 32.4 | 8.00 | 0.012 | — |
| 2.20 | 7.36 | 33.3 | 7.56 | 0.012 | — |

*Dry Weight Basis

It is apparent from the Table I that the feed product is essentially neutral, contains virtually no free ammonia or amines, and furnishes a large proportion of the protein and fat content necessary for the ruminant diet. The protein contribution comes in part from residual dietary components and in part from the fecal bacteria. To demonstrate the acceptability of the feed supplement of the present invention to ruminant animals, feeding tests were undertaken as set forth in the following Examples.

EXAMLE I

Feedlot waste was collected from a cattle feedlot (primarily cattle manure) and mixed with equal parts of a 1:1 mixture of cottonseed hulls and ground corn. The feedlot waste was treated with from 1–2% formaldehyde by weight of the waste material. The final feed product contained, by weight:

50% treated feedlot wastes
25% cottonseed hulls
25% ground corn.

Eight Holstein steers weighing approximately 700 pounds each were group fed the feed product for 56 days to determine acceptability. The daily intake for the eight steers varied between about 125 and 180 pounds dry matter/day. It was concluded, based upon experience using conventional feeds and feed supplements, that the feed product of the present invention was highly acceptable to the steers.

EXAMPLE II

Thirty steer calves were randomly divided into two groups. One of the groups was fed a feed product containing aldehyde-treated feedlot wastes (primarily cattle manure) and the other group was fed the same product except that the feedlot wastes were untreated. The feed product for each of the groups was be weight, as follows:

| | |
|---|---|
| Feedlot waste | 50% |
| Ground corn | 28% |
| Cottonseed hulls | 18.7% |
| Corn gluten meal | 3.3% |
| | 100% |

In forming the treated feedlot waste feed product, 1.75% formaldehyde by weight of the feedlot waste material was used.

The average feed product consumption (dry matter basis) per day for each of the calves in the respective groups was:

Untreated feed product: 5.95 lbs.
Formaldehyde treated feed product: 7.76 lbs.

Even when these intake values were re-calculated on the basis of metabolic weight in an effort to eliminate any errors inherent in the random group assignments due to variations in the initial weight of the calves, the average feed product consumption was still greatly in favor of the formaldehyde-treated waste containing feed as follows:

Untreated feed product: 10.22 lbs. per 100 units of metabolic weight
Formaldehyde treated feed product: 13.47 lbs. per 100 units of metabolic weight.

This difference in voluntary intake greatly favoring the treated feed product is considered highly significant ($p<0.005$) as an indication of the effectiveness of the present process.

It will be appreciated that the aldehyde-treated excreta supplemental feed composition of the present invention is particularly well suited as a supplement to the usual forage (e.g., grass, hay, and the like) diet of ruminants, as a forage replacement. The supplement furnishes a large proportion of the ruminant's need for protein and practically its entire need for supplemental minerals, except perhaps for sodium chloride. Depending upon the type of ruminant diet it is supplementing, the supplemental feed composition of the present invention may beneficially comprise from as little as 5% of the entire feed up to 50% or more of the feed. For example, the supplemental feed composition advantageously comprises up to about 25% of a finishing or fattening diet, up to about 30–40% of a growing diet, and up to about 50% of a maintenance diet. Depending upon the needs of the ruminant, it is contemplated that carbohydrate supplements (e.g., wheat, oats, barley, corn, hominy, molasses) will always be employed in conjunction with the supplement of the present invention and that protein supplements (e.g., oilseed meals) will sometimes be utilized as well. However, mineral supplements will hardly ever be needed when the supplement of the present invention is employed.

Thus, in accordance with the foregoing, the present invention has provided a method for the treatment of livestock and poultry waste for the purpose of inhibiting the production of offensive odors and assisting in the abatement and management of air pollution caused by these wastes. By virtue of the hereindescribed method, the aesthetic and organoleptic properties of the waste materials have been siginificantly improved and, consequently, the animal's acceptability of diets which contain relatively high levels of the treated wastes have also been improved. Moreover, the hereindescribed method has made practical the formulation of a supplemental feed composition from such wastes, suitable for commercial use, by virtue of destroying the pathogenic microbes and by increasing the shelf life of the composition. As an incidental benefit, the treatment of the waste material with aldehydes reduces the rate of ammonia release from non-protein nitrogen material, such as, urea, in the waste and thereby reduces the chance of ammonia toxicity in the animals.

Furthermore, inasmuch as livestock and poultry wastes may contain 0.5% to 3.0% by weight nitrogen, 0.25% by weight phosphorus as $P_2O_5$ and 0.5% by weight potassium as $K_2O$, and since the treated wastes are substantially odor-free, non-air polluting, pathogen free and aesthetically acceptable, they are suitable for use as an inexpensive, low analysis source of plant nutrients and soil conditioner for the production of flowers, shrubs, vegetable gardens, lawns, field crops and pastures.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A method for treating waste matter selected from livestock and poultry waste to provide an animal feed supplement for ruminants having acceptable aesthetic and organoleptic properties which comprises mixing said waste matter selected from livestock and poultry excreta with a quantity of liquid aldehyde from 0.10 to 3.0% by weight of said excreta to react said excreta substantially immediately with said liquid aldehyde, all of said liquid aldehyde reacting with said excreta to completely neutralize substantially all free ammonia and amine of said excreta, wherein substantially all pathogenic fecal microbes contained in said excreta are destroyed and mould growth in said excreta is prevented over an extended storage period under aerobic conditions; and, feeding the mixture thus formed to ruminant animals.

2. A method, as claimed in claim 1, wherein said excreta is contacted with from 0.74 to 2.2% of said aldehyde.

3. A method, as claimed in claim 2, wherein said aldehyde is formaldehyde in aqueous solution.

4. The method, as claimed in claim 1, wherein said aldehyde is selected from the group consisting of formaldehyde, glyoxal, acetaldehyde, acrolein, propionaldehyde, n-butyraldehyde, n-valeraldehyde, isobutyraldehyde, and glutaraldehyde.

5. The method, as claimed in claim 1, including the additional step of adjusting the moisture content to within the range of 10 to 70%.

6. A method of feeding ruminant animals comprising feeding said animals a diet comprising a bulk-furnishing component and a carbohydrate-furnishing component and including a supplement therein, said supplement consisting essentially of the reaction product of excreta selected from livestock and poultry excreta and from 0.1 to 3.0% by weight of said excreta of a liquid aldehyde.

7. A method, as claimed in claim 6, wherein said excreta is contacted with from 0.74 to 2.2% of said aldehyde.

8. A method, as claimed in claim 7, wherein said aldehyde is formaldehyde in aqueous solution.

9. A method, as claimed in claim 6, wherein said excreta is primarily cow manure.

10. A method, as claimed in claim 6, wherein said supplement has a moisture content in the range of 10 to 70% by weight.

* * * * *